United States Patent
Sarh et al.

(10) Patent No.: US 8,573,070 B2
(45) Date of Patent: Nov. 5, 2013

(54) FORCE AND NORMALITY SENSING FOR END EFFECTOR CLAMP

(75) Inventors: Branko Sarh, Huntington Beach, CA (US); James D. Gamboa, Anaheim, CA (US); Chris J. Erickson, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 13/032,596

(22) Filed: Feb. 22, 2011

(65) Prior Publication Data

US 2012/0210802 A1 Aug. 23, 2012

(51) Int. Cl.
*G01L 1/10* (2006.01)

(52) U.S. Cl.
USPC .............. 73/862.625; 901/34; 901/35

(58) Field of Classification Search
USPC ............... 73/862.625, 152.49, 1.79; 901/31, 901/33–35
See application file for complete search history.

(56) References Cited

U.S. PATENT DOCUMENTS

| | | | | |
|---|---|---|---|---|
| 3,891,918 A | * | 6/1975 | Ellis | 324/207.16 |
| 5,297,760 A | * | 3/1994 | Hart-Smith | 244/132 |
| 6,357,101 B1 | * | 3/2002 | Sarh et al. | 29/407.09 |
| 6,486,436 B1 | * | 11/2002 | Shah et al. | 219/121.82 |
| 6,536,100 B2 | | 3/2003 | Sarh et al. | |
| 7,088,210 B2 | | 8/2006 | Day et al. | |
| 7,148,776 B2 | | 12/2006 | Day et al. | |
| 2002/0050043 A1 | | 5/2002 | Sarh et al. | |
| 2006/0143890 A1 | | 7/2006 | Linnemann et al. | |
| 2010/0204817 A1 | | 8/2010 | Fujita | |

OTHER PUBLICATIONS

Authors: Olsson, T., Haage, M., Kihlman, H., Johansson, R., et al., Title: Cost-efficient drilling using industrial robots with high-bandwidth force feedback, Date: Feb. 2010, Publisher: Elsevier, Publication: Robotics and Computer-Integrated Manufacturing, pp. 24-38.*
Author: David J. Hall, Title: Robotic Sensing Devices, Date: Mar. 1984, Publisher: Robotics Institute, Carnegie-Mellon University, pp. cover and 11-94.*
Author: Robert Isaksson, Title: Drilling with force feedback, Date: Sep. 23, 2009, Publisher: Linkoepings University, pp. 1-84.*

* cited by examiner

*Primary Examiner* — Lisa Caputo
*Assistant Examiner* — Roger Hernandez-Prewitt
(74) *Attorney, Agent, or Firm* — Hugh P. Gortler

(57) ABSTRACT

A robotic system comprises an end effector including an electromagnetic clamp, a force sensor attached to the end effector for measuring force exerted by the clamp against a work piece surface, and a plurality of normality sensors. The normality sensors are positioned about the force sensor to determine whether the clamp is normal to the surface before the force sensor makes contact with the surface.

18 Claims, 7 Drawing Sheets

FORCE AND NORMALITY SENSING FOR END EFFECTOR CLAMP

BACKGROUND

During assembly of a commercial aircraft, certain operations are performed synchronously inside and outside of confined spaces. Consider a fastening operation on a spar to panel of a wing box. An assembly system outside the wing box performs drilling, countersinking and fastener insertion tasks on one side of the panel. A person or system inside the wing box on an opposite side of the panel places a sleeve and nut over the inserted fastener.

During drilling, the assembly system needs to apply a proper clamping force against the panel. If an electromagnet is being used to apply the clamping force, the clamping force may be estimated according to current supplied to the electromagnet's coil. However, the estimation is not always correct. An incorrect estimation can lead to insufficient clamping force.

If the clamping force is insufficient during a drilling operation, the drill can shift. Consequently, the location of the drilled hole could be out of tolerance. In view of then number of holes that need to be drilled with precision in a commercial aircraft, the cost of out-of-tolerance holes can be quite substantial.

It would be desirable to accurately measure the clamping force during drilling instead of estimating the clamping force.

SUMMARY

According to an aspect herein, a robotic system comprises an end effector including an electromagnetic clamp, a force sensor attached to the end effector for measuring force exerted by the clamp against a work piece surface, and a plurality of normality sensors. The normality sensors are positioned about the force sensor to determine whether the clamp is normal to the surface before the force sensor makes contact with the surface.

According to another aspect herein, an electromagnetic clamp comprises a core, windings wrapped around the core, a force sensor at a clamp surface, and a plurality of linear displacement sensors disposed about the force sensor. The linear displacement sensors have tips extending further from the clamp surface than the force sensor, which enables normality of the clamp with respect to a work piece surface to be determined without the force sensor touching the surface.

According to another aspect herein, a method comprises using a clamp to perform a manufacturing operation on a work piece, where the clamp includes a force sensor for measuring clamping force of the clamp against a surface of the work piece. Using the clamp includes positioning the clamp's clamping surface proximate to the work piece surface, determining normality of the clamping surface with respect to the work piece surface before the clamping surface touches the work piece surface, moving the clamping surface towards the work piece surface while maintaining normality of the clamping surface, and clamping the clamp against the work piece surface.

DETAILED DESCRIPTION

Figure 1:
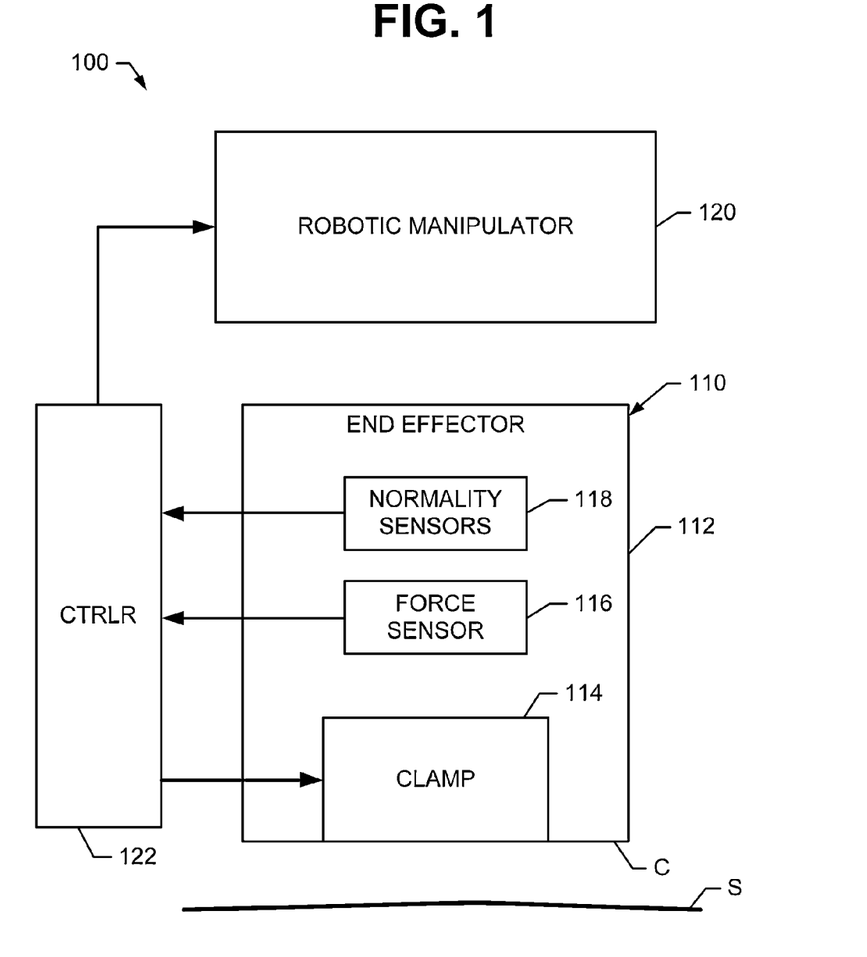
FIG. 1 is an illustration of a robotic system including an end effector.

Reference is made to FIG. 1, which illustrates a robotic system 100 for clamping an end effector 110 against a work piece surface (S) with measured clamping force. The end effector 110 includes a body 112 and an electromagnetic clamp 114. In some embodiments, the body 112 and the clamp 114 may be integrated. In other embodiments, the body 112 and the clamp 114 may be separate elements.

During operation of the system 100, a clamping surface (C) of the end effector 110 will be moved opposite the work piece surface (S). The end effector 110 further includes a force sensor 116 for measuring a force exerted by the clamp 114 against the work piece surface (S). For instance, the force sensor 116 may include a strain gauge, hydraulic sensor, or shape memory sensor. Readings are most accurate when the clamping surface (C) is normal to the work piece surface (S).

The end effector 110 further includes a plurality of normality sensors 118 positioned about the force sensor 116. In some embodiments, the normality sensors 118 may be linear displacement sensors. In other embodiments, the normality sensors 118 may be proximity sensors. The normality sensors 118 are capable of determining whether the clamping surface (C) is normal to the work piece surface (S) before the force sensor 116 makes contact with the work piece surface (S). This arrangement allows motion of the normality sensors 118 to be decoupled from the force sensor 116 so that the clamping force can be normalized with respect to the work piece surface (S). The force measurements are more accurate when the force sensor 116 is normal to the surface of the work piece. Decoupling the motion further improves the accuracy. Say the force sensor 116 was in contact with the work piece surface while normality was being determined. The end effector 110 would require a more complex design including spherical bearings between the force sensor and end effector in order to rotate the clamp while the force sensor was touching the work piece surface (S). Consequently, reactionary forces would wear down the spherical bearings and cause the clamp to shift. Decoupling the motion avoids these problems. In addition to measuring the clamping force with higher accuracy, the system 100 has a simpler design that does not require spherical bearings.

The robotic system 100 further includes a robotic manipulator 120 for moving the end effector 110. The robotic manipulator 120 may include, for example, a robotic arm.

The robotic system 100 further includes a controller 122 for commanding the robotic manipulator 120 to move the end effector 110. The controller 122 also reads the force and normality sensors 116 and 118; and controls the clamp 114 to generate a clamping force. The controller 122 may be microprocessor-based.

Figure 2:
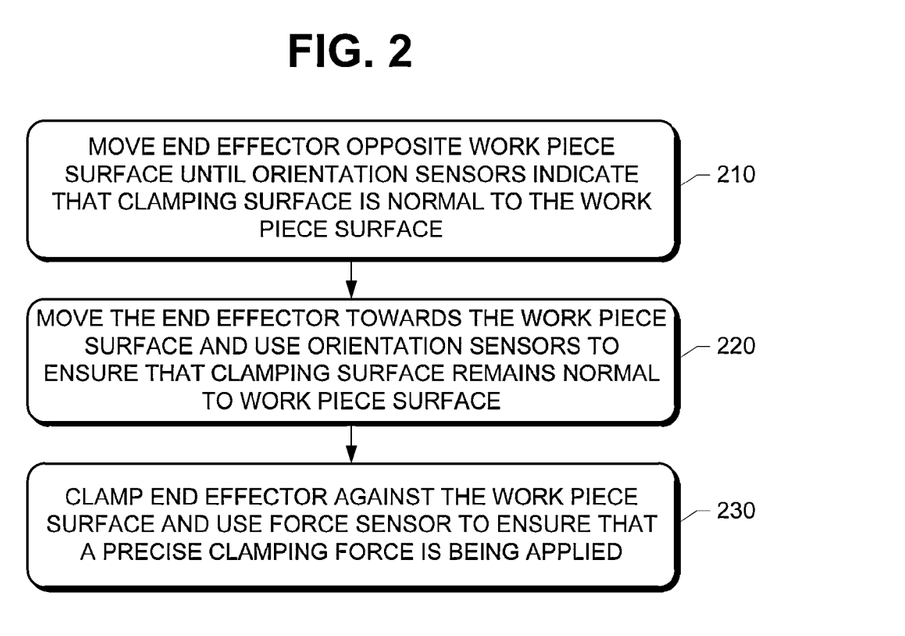
FIG. 2 is an illustration of a method of controlling the robotic system to clamp the end effector against a surface of a work piece.

Reference is now made to FIG. 2, which illustrates certain functions performed by the controller 122. At block 210, the controller 122 commands the robotic manipulator 120 to move the end effector 110 opposite the work piece surface (S) until the normality sensors 118 indicate that the clamping surface (C) is normal to the work piece surface (S). During this movement, the force sensor 116 does not make contact with the work piece surface (S).

At block 220, the controller 122 commands the robotic manipulator 120 to move the end effector 110 towards the work piece surface (S). The controller 122 also uses the normality sensors 118 to ensure that the clamp surface (C) remains normal to the work piece surface (S).

At block 230, the controller 122 reads the force sensor 116 to determine when the end effector 110 makes contact with the work piece surface (S). With the clamp normal to the work piece surface (S), the controller 122 commands the clamp 114 to generate a clamping force. The clamping force causes the end effector 110 to be clamped against the work piece surface (S). The controller 122 reads the force sensor 116 and controls the clamp 114 to ensure that a precise clamping force is being applied.

Figure 3:
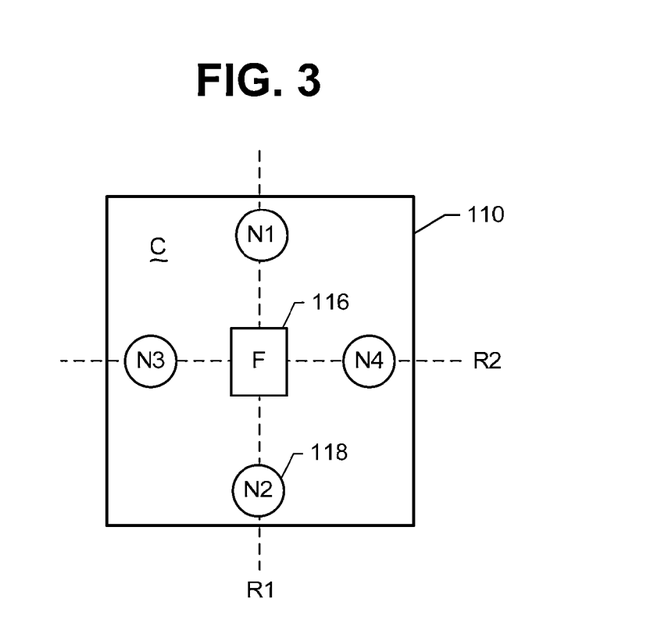
FIG. 3 is an illustration of force and normality sensors with respect to axes of an end effector.

Reference is now made to FIG. 3, which shows an embodiment in which four normality sensors 118 are spaced around the force sensor 116. A first pair of opposing sensors 118, designated N1 and N2, is located along a first rotational axis (R1). A second pair of opposing sensors, designated N3 and N4, is located along a second rotational axis (R2). The four normality sensors 118 may be used on planar and non-planar surfaces. In some embodiments, three normality sensors 118 may be used on planar surfaces.

Figure 4A:
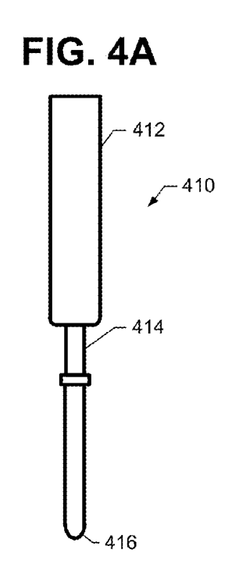
FIG. 4A is an illustration of a normality sensor.

Reference is now made to FIG. 4A, which illustrates an embodiment of a normality sensor 410. The normality sensor 410 of FIG. 4 may be a linear displacement sensor 412 such as a linear variable differential transformer (LVDT). The sensor 410 includes a pin 414 and coil (not shown). A tip 416 of the pin 414 is configured to make contact with the surface of a work piece. During operation, the pin 414 is moved relative to the coil, which senses a voltage. The change in voltage is proportional to the displacement of the pin 414.

In some embodiments, the force and/or normality sensors 116 and 118 may be mounted to the end effector 110 separately from the clamp 114. In other embodiments, one or more of the sensors 116 and 118 may be integrated with the clamp 114.

Figure 5:
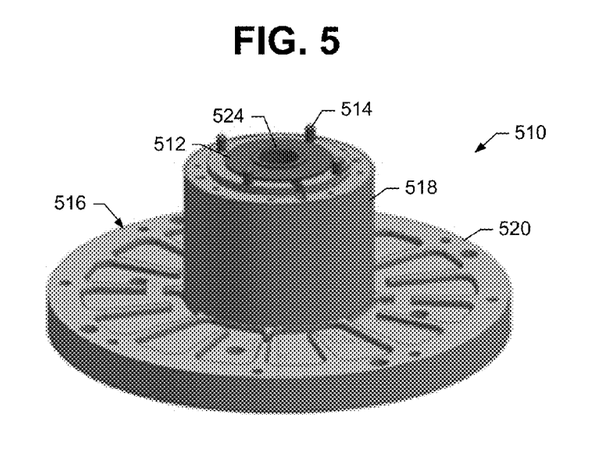
FIG. 5 is an illustration of a core of an electromagnetic clamp with force and normality sensors embedded in the core.
Figure 6:
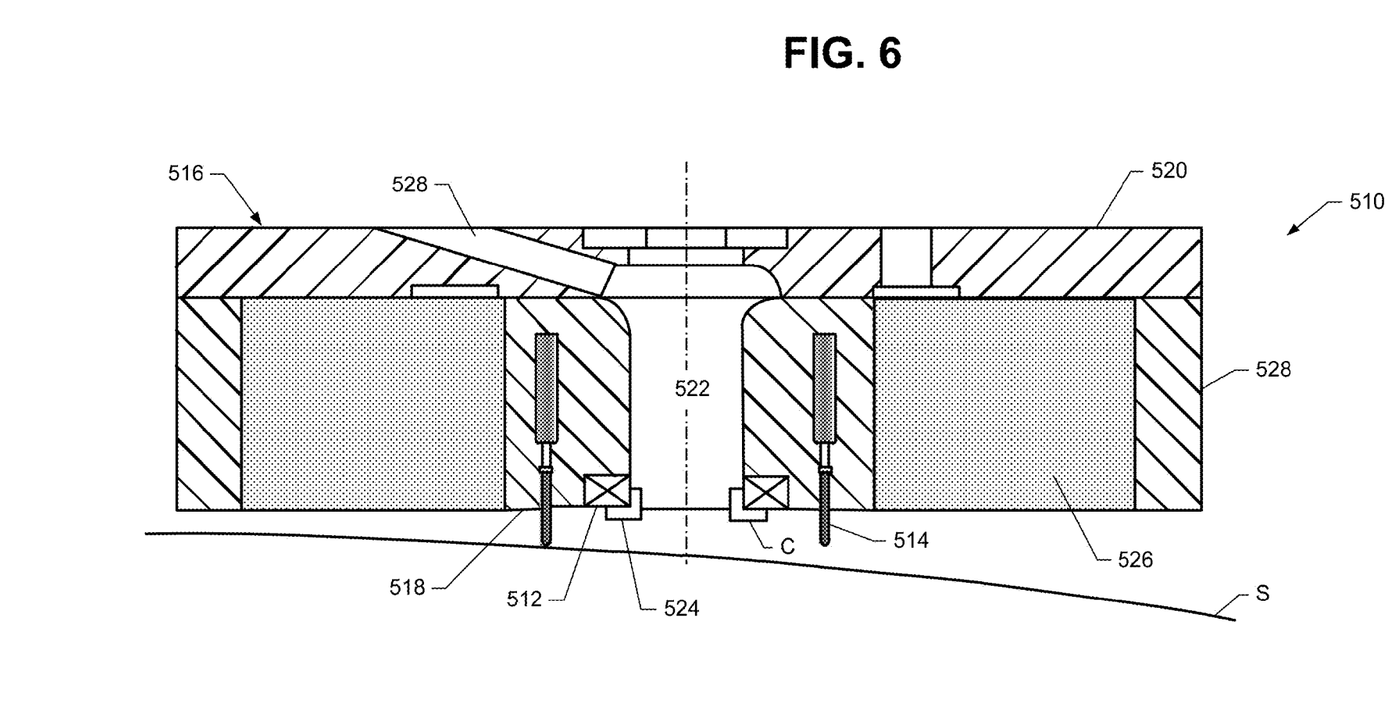
FIG. 6 is an illustration of an electromagnetic clamp including the core of FIG. 5.

Reference is now made to FIGS. 5 and 6, which illustrate an embodiment of an electromagnetic clamp 510 with integrated force and normality sensors 512 and 514. The clamp 510 includes a core 516 having a hub 518 and a plate 520. An axial passage 522 extends through the hub 518 and the plate 520.

The force sensor 512, which has a donut shape, is embedded in the hub 518 and surrounds the axial passage 522. A bushing 524 retains the force sensor 512 in the hub 518 and extends outward from the hub 518. The bushing 524 provides a clamping surface (C). Only the clamping surface (C) of the bushing 524 will make contact with the work piece surface (S). In some embodiments, the bushing 524 and force sensor 512 may be separate elements. In other embodiments, the bushing 524 and force sensor 512 may be integrated.

Four normality sensors 514 of the type shown in FIG. 4A are spaced around the axial passage 522. Each linear displacement sensor is embedded in the hub 518 with a corresponding movable pin. The pin can be moved so its tip extends past the clamping surface (C). The pin can be moved so its tip is flush with or below the clamping surface (C)

The normality sensors 514 are arranged in the pattern shown in FIG. 3. Two opposing normality sensors 514 (N1 and N2) are located along the first axis R1. The other two opposing normality sensors 514 (N3 and N4) are located along the second axis R2.

Windings 526 are wrapped around the hub 518. When energized, the windings 526 create an electromagnetic field. A shell 528 covers the windings 526.

The core 510 of FIGS. 5 and 6 contains several features specific to drilling operations. The axial passage 522 allows a drill bit to be inserted therethrough. A chip exit port 530 allows chips to be removed during drilling.

Additional reference is now made to FIGS. 7 and 8A-8D, which illustrate the operation of the electromagnetic clamp 510. The operation begins with sensor calibration. A calibration plate 810 having a raised portion 812 and lower portion 814 may be used.

Figure 7:
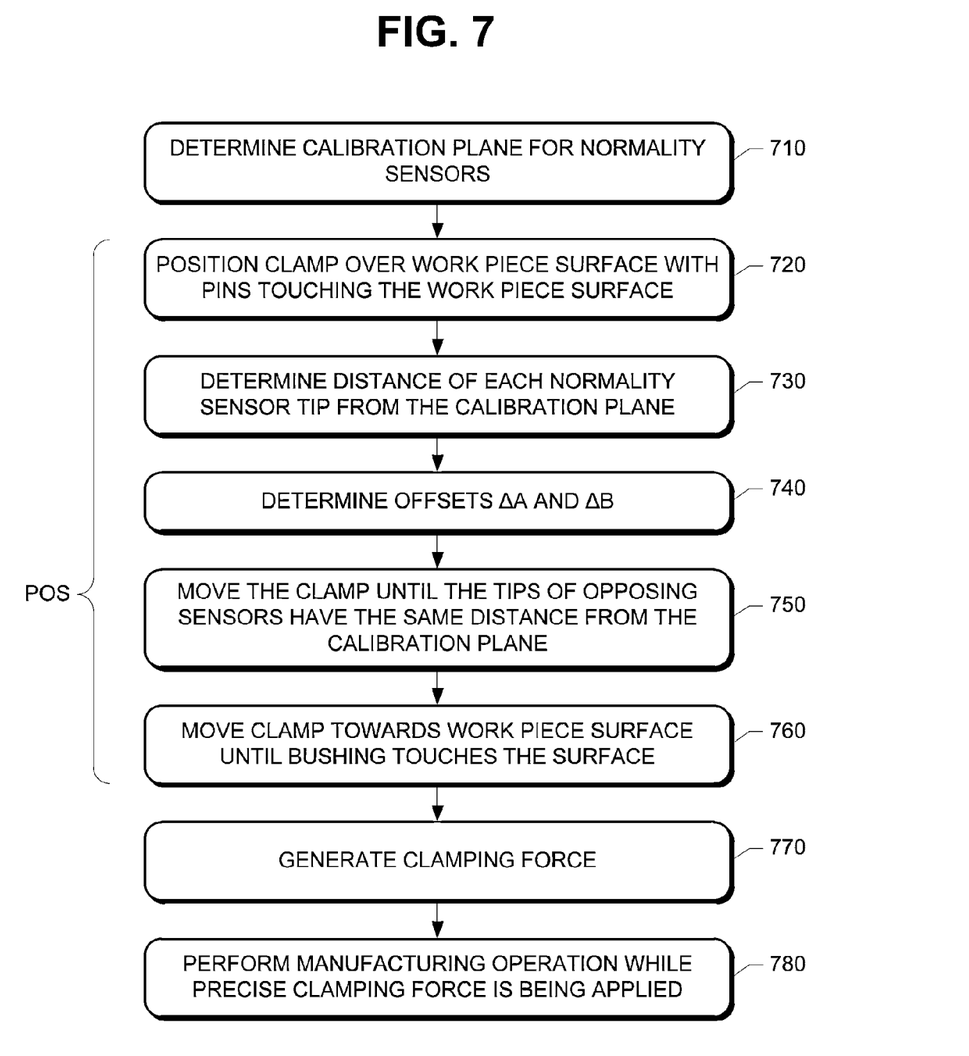
FIG. 7 is an illustration of a method of controlling the electromagnetic clamp of FIG. 6.

At block 710, a calibration plane for the normality sensors 514 is determined. The clamp 510 is positioned over the calibration plate 810, with the bushing 524 resting on raised portion 812, and all four normality sensors 514 making contact with the lower portion 814 (see FIG. 8A). The position of each normality sensor 514 is read and stored. These stored positions define the calibration plane.

Figure 8A:
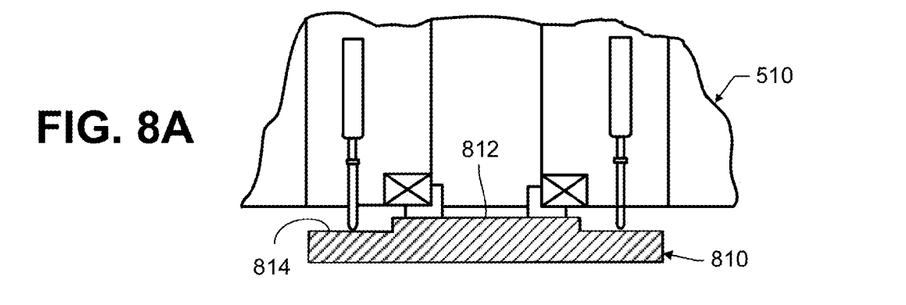
FIGS. 8A-8D are illustrations of the electromagnetic clamp of FIG. 6 during calibration, positioning, and clamping.
Figure 8B:
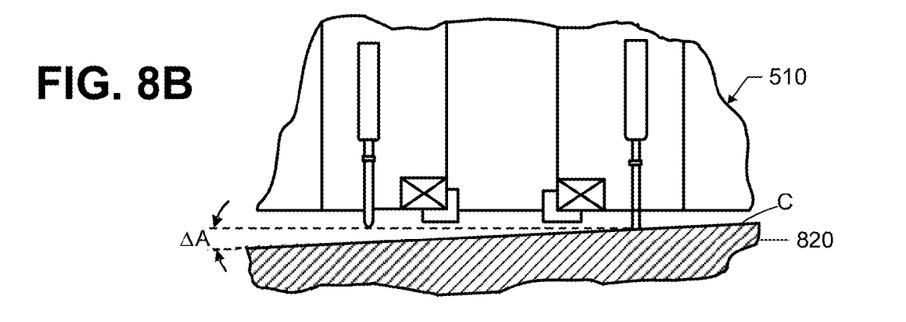
Figure 8C:
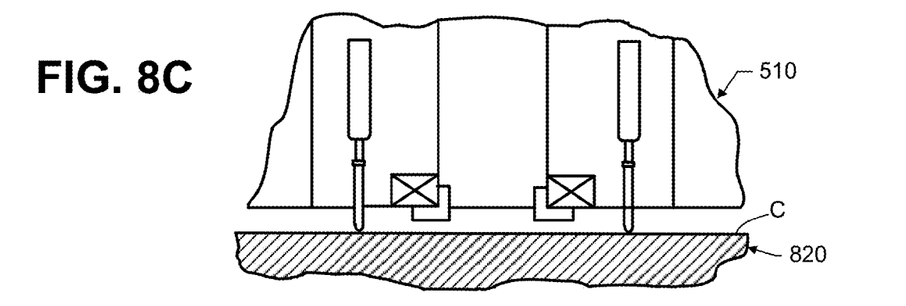

Sensor calibration having been completed, the clamp 510 is removed from the calibration plate 810. As the clamp 510 is removed, the pin tips extend past the calibration plane.

Figure 4B:
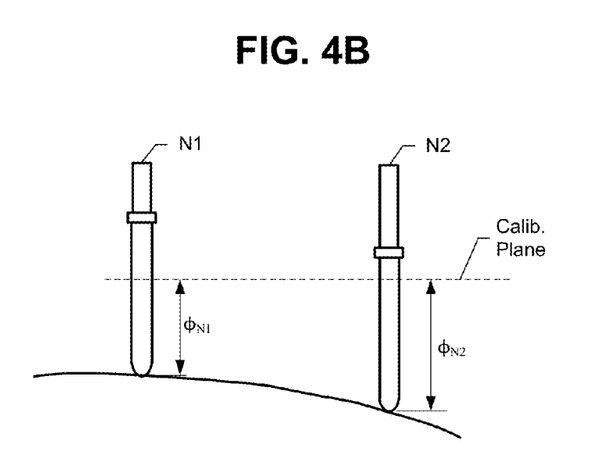
FIG. 4B is an illustration of two normality sensor tips with respect to a calibration plane.

Next, the clamp 510 is positioned on the surface (S) of the work piece 820. At block 720, the clamp 510 is positioned such that the extended pins of the normality sensors 514 touch the surface (S) (see FIG. 8B). At block 730, the normality sensors 514 are read to determine the distance ϕ of each tip from the calibration plane. FIG. 4B shows the distances $\phi_{N1}$ and $\phi_{N2}$ for the normality sensors N1 and N2.

At block 740, the offset ΔA is determined as $\phi_{N1}-\phi_{N2}$. Similarly, the offset ΔB is determined as $\phi_{N3}-\phi_{N4}$.

At block 750, the clamp 510 is manipulated until the tips of opposing sensors have the same distance from the calibration plane. That is, the clamp is moved until both ΔA=0 and ΔB=0 (see FIG. 8C). When ΔA=0 and ΔB=0, the clamping surface (C) is considered normal to the work piece surface (S).

At block 760, the clamp 514 is moved toward the work piece surface (S), ensuring that ΔA and ΔB remain at ΔA=0 and ΔB=0. In this manner, the clamping surface (C) stays normal as it is being moved towards the work piece surface (S). The force sensor 512 is monitored to determine when the bushing 524 makes contact with the work piece surface (S).

Figure 8D:
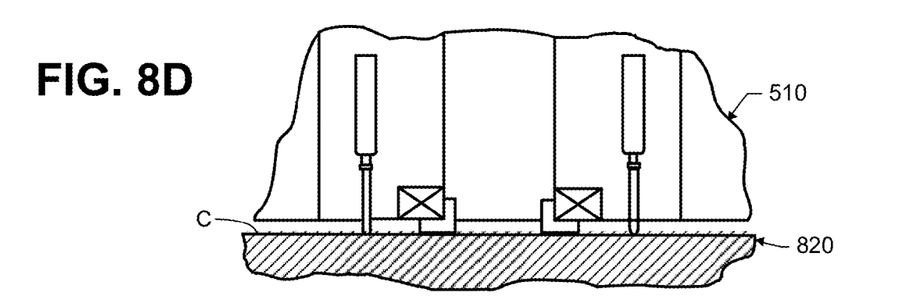

Motion of the clamp 510 is stopped when the force sensor 512 indicates that the bushing 524 touches the work piece surface (S) (see FIG. 8D). At this point, the clamp 510 is normal to the surface (S), but a clamping force has yet to be applied.

At block 770, the winding 526 is energized to generate a clamping force. At block 780, a manufacturing operation is performed while the clamping force is being applied. At blocks 770 and 780, the force sensor 512 is continually read to determine the actual clamping force being applied, and the current to the windings 526 is adjusted to ensure that the precise clamping force is being applied during the manufacturing operation.

Figure 9:
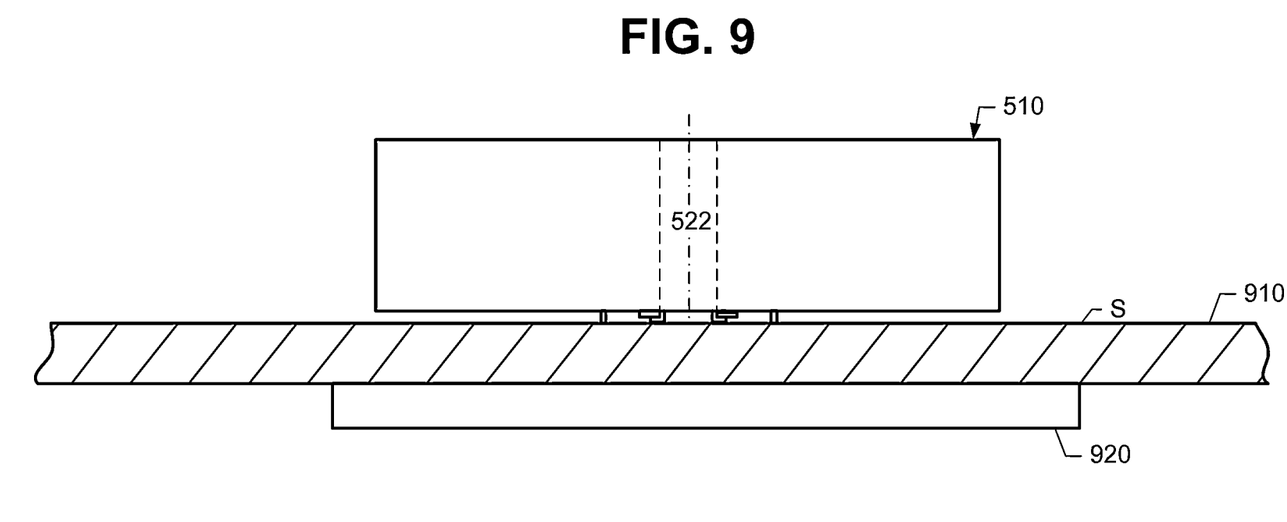
FIG. 9 is an illustration of the electromagnetic clamp during a manufacturing operation.

Reference is now made to FIG. 9, which illustrates the clamp 510 during a manufacturing operation on a work piece 910 made of composite or other non-metal. The clamp 510 may be calibrated and then positioned on one side of the work piece 910, and a metallic backing plate 920 such as a steel plate is positioned on an opposite side of the work piece 910. When the windings of the clamp 510 are energized, the work piece 910 is clamped between the clamp 510 and the backing plate 920. The bushing provides a high clamping force around the location that will be drilled.

The manufacturing operation may include inserting a drill through the axial passage of the clamp 510 and drilling a hole in the work piece 910. As the hole is being drilled, vacuum is applied to the exit port to remove drill chips. After the hole has been drilled, the drill is removed, and a fastener is inserted into the axial passage 522 and through the drilled hole. The clamping force is released, the backing plate 920 removed, and a nut is placed on the fastener.

The manufacturing operation of FIG. 9 may be used during assembly of an aircraft. For instance, it may be used to fasten a spar to panel of a wing box. The clamp 510 is used to perform drilling, countersinking and fastener insertion tasks on one side of the panel. A person or system inside the wing box on an opposite side of the panel places a sleeve and nut over the inserted fastener. U.S. Publication No. 2009/0287352 describes a robotic system that can place a sleeve or nut over a fastener in a confined space that is accessible only through an access port.

The invention claimed is:

1. A robotic system comprising:
an end effector including an electromagnetic clamp;
a force sensor attached to the end effector for measuring force exerted by the clamp against a work piece surface; and
a plurality of displacement sensors attached to the end effector and spaced apart from the force sensor for determining whether the clamp is normal to the surface before the force sensor makes contact with the surface;
wherein sensing by the displacement sensors is decoupled from sensing by the force sensor.

2. The system of claim 1, wherein the normality sensors include at least three sensors for measuring orientation about first and second rotational axes of the clamp.

3. The system of claim 1, further comprising:
a robotic manipulator for moving the end effector; and
a controller, responsive to outputs of the normality sensors, for commanding the robotic manipulator to move the end effector until the clamp is normal to the work piece surface without allowing the force sensor to make contact with the work piece surface.

4. The system of claim 3, wherein the controller is configured to command the clamp to generate a clamping force in response to an output of the force sensor.

5. The system of claim 3, further comprising a calibration plate for calibrating positions of the normality sensors, the calibration plate having a raised portion upon which the force sensor rests and a lower portion upon which defines a calibration plane for the tips of the normality sensors.

6. The system of claim 3, wherein the controller is configured to determine a calibration plane for the normality sensors; move the clamp onto a work piece surface, determine pin distances from the calibration plane, and then orient the clamp so the distances of opposing normality sensors are equal.

7. The system of claim 1, wherein the force sensor is located at a surface of the clamp; and wherein each normality sensor includes a pin and a linear displacement sensor for determining position of the pin, each pin movable so its tip can extend beyond the clamp surface.

8. The system of claim 1, wherein the force and normality sensors are integrated with the clamp.

9. An electromagnetic clamp comprising:
a core;
windings wrapped around the core;
a force sensor attached to the core at a clamp surface; and
a plurality of linear displacement sensors attached to the core and disposed about the force sensor, the linear displacement sensors having tips extending further from the clamp surface than the force sensor, which enables normality of the clamp with respect to a work piece surface to be determined without the force sensor touching the surface such that operation of the force sensor is decoupled from operation of the displacement sensors.

10. The clamp of claim 9, wherein four linear displacement sensors are attached to the core and disposed about the force sensor.

11. The clamp of claim 9, wherein each linear displacement sensor includes a linear variable differential transformer (LVDT) embedded in the core and a pin extending from the LVDT.

12. The clamp of claim 9, further comprising a bushing for securing the force sensor to the core, wherein the bushing provides the clamp surface.

13. A method of using the clamp of claim 9, comprising:
determining a calibration plane for the linear displacement sensors;
positioning the clamp over a work piece with the tips of all normality sensors touching the work piece surface;
determining distance of each tip from the calibration plane;
re-orienting the clamp until distances of opposing sensors are equal;
moving the clamp towards the work piece surface until the clamp surface touches the work piece surface while maintaining the equal distances; and
applying the clamping force.

14. A method of using the clamp of claim 13, further comprising performing a manufacturing operation on the work piece, including:
inserting a drill through an axial opening in the core, and
using the drill to drill a hole in the work piece while reading the force sensor and controlling current to the winding to ensure that a precise clamping force is applied during drilling.

15. A method comprising using a clamp to perform a manufacturing operation on a work piece, the clamp including a force sensor for measuring clamping force of the clamp against a surface of the work piece, wherein using the clamp includes:
positioning the clamp's clamping surface proximate to the work piece surface;
using displacement sensors to determine normality of the clamping surface with respect to the work piece surface before the clamping surface touches the work piece surface;
moving the clamping surface towards the work piece surface while maintaining normality of the clamping surface; and
clamping the clamp against the work piece surface;
wherein sensing by the displacement sensors is decoupled from sensing by the force sensor.

16. The method of claim 15, wherein the manufacturing operation includes a drilling operation.

17. The method of claim 15, wherein the clamp is an electromagnetic clamp; wherein the work piece includes a composite aircraft panel; the method further comprising placing a metal backing panel behind the composite panel; and clamping the electromagnetic clamp to the metal backing panel.

18. The method of claim 15, wherein the normality is determined without using the force sensor.

* * * * *